United States Patent
Duffy et al.

(10) Patent No.: US 10,776,722 B2
(45) Date of Patent: Sep. 15, 2020

(54) CREDIBILITY RATING ALGORITHM

(75) Inventors: Maureen Emily Duffy, Westford, MA (US); Evangeline A. McGlynn, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1715 days.

(21) Appl. No.: 12/328,701

(22) Filed: Dec. 4, 2008

(65) Prior Publication Data

US 2010/0145958 A1     Jun. 10, 2010

(51) Int. Cl.
    *G06Q 10/00*     (2012.01)
    *G06Q 10/06*     (2012.01)

(52) U.S. Cl.
    CPC ........... *G06Q 10/00* (2013.01); *G06Q 10/063* (2013.01)

(58) Field of Classification Search
    CPC ..................................................... G06Q 10/00
    See application file for complete search history.

(56) References Cited

U.S. PATENT DOCUMENTS

| | | | |
|---|---|---|---|
| 6,892,179 B1 * | 5/2005 | Zacharia | G06Q 10/04 705/4 |
| 2002/0049738 A1 * | 4/2002 | Epstein | 707/1 |
| 2002/0062368 A1 * | 5/2002 | Holtzman et al. | 709/224 |
| 2002/0133365 A1 * | 9/2002 | Grey et al. | 705/1 |
| 2003/0216962 A1 * | 11/2003 | Heller et al. | 705/14 |
| 2003/0217056 A1 * | 11/2003 | Allen et al. | 707/7 |
| 2004/0060051 A1 * | 3/2004 | Bradshaw | G06Q 10/06 398 718/106 |
| 2005/0033593 A1 * | 2/2005 | Abrams | 705/1 |
| 2007/0033092 A1 * | 2/2007 | Iams | 705/10 |
| 2007/0179834 A1 * | 8/2007 | Carter et al. | 705/10 |
| 2008/0109244 A1 * | 5/2008 | Gupta | 705/1 |
| 2008/0134298 A1 * | 6/2008 | Nathan et al. | 726/4 |
| 2009/0070128 A1 * | 3/2009 | McCauley et al. | 705/1 |
| 2010/0005099 A1 * | 1/2010 | Goodman | G06F 21/62 707/E17.005 |

FOREIGN PATENT DOCUMENTS

EP         1014630 A2 *   6/2000           H04L 12/587

OTHER PUBLICATIONS

NotebookReviewTM, New Reputation System, post from Amber on Feb. 24, 2006.*
Mobile Read Forums, Reputation (Karma) System, post from Alexander Turcic on Feb. 27, 2004.*
Talwar et al.,, Understanding User Behavior in Online Feedback Reporting, EC'07, Jun. 11-15, 2007.*
http://bugzilla.gnome.org/page.cgi?id=points.html; Mar. 17, 2009; 2 pages.

* cited by examiner

*Primary Examiner* — Nadja N Chong Cruz
(74) *Attorney, Agent, or Firm* — Lowenstein Sandler LLP

(57) ABSTRACT

A method and apparatus for providing a credibility rating and management system. The credibility rating and management system can be shared amongst any number of independent systems. The credibility rating and management system collects data points from each of the participant systems, tracks user profiles across each of the participant systems and generates a rating for each user profile. Associated systems can then query the credibility rating and management system to obtain the credibility rating for a user and incorporate the credibility ratings into their own systems.

11 Claims, 6 Drawing Sheets

FIG. 2

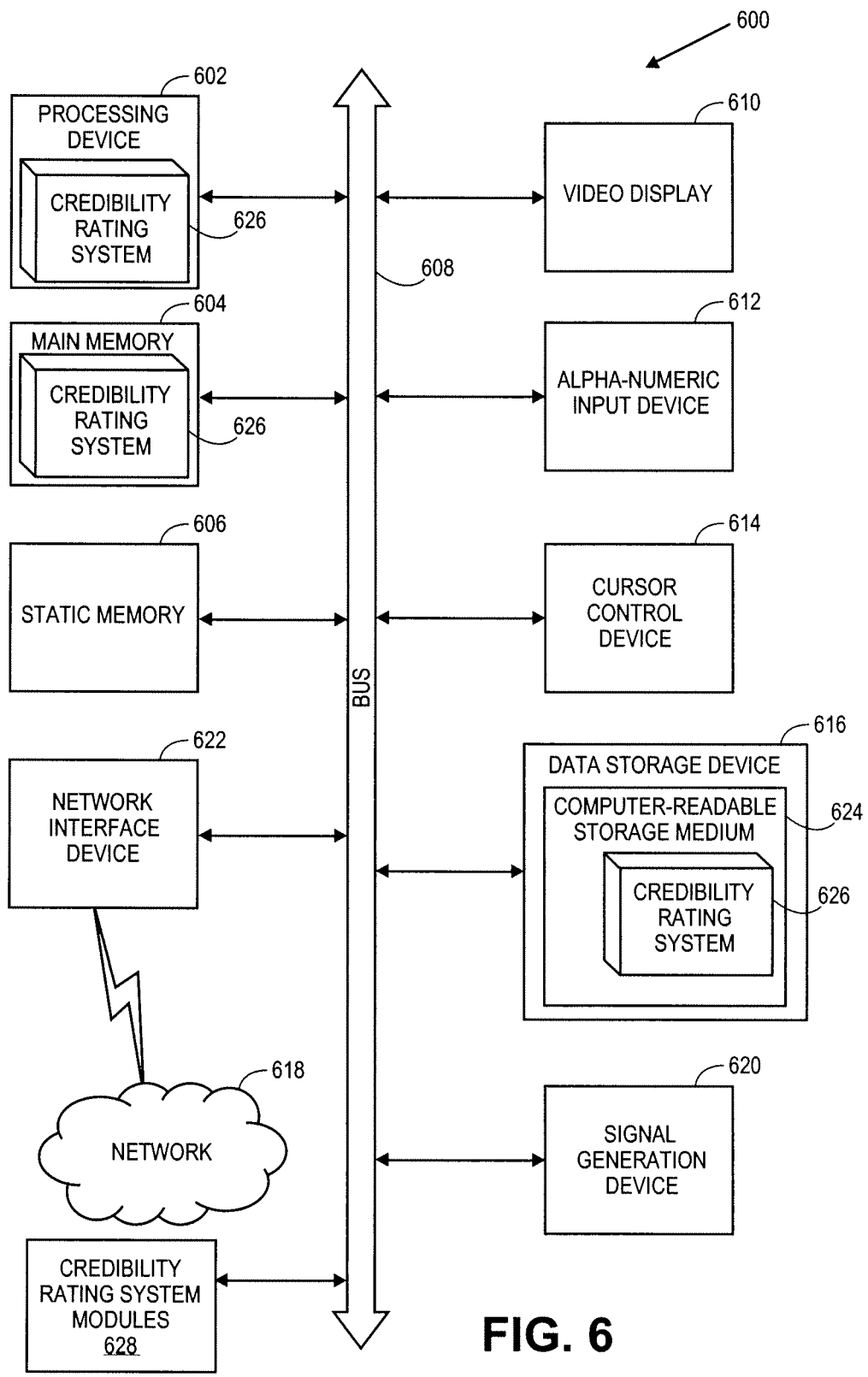

CREDIBILITY RATING ALGORITHM

TECHNICAL FIELD

Embodiments of the present invention relate to a method and system for generating a credibility rating. Specifically, the embodiments of the present invention relate to a method and system for generating a credibility rating based on feedback data from multiple independent systems.

BACKGROUND

In many work environments, online community environments, open source management projects and similar collaborative efforts, there are many participants that have only limited knowledge of and history with one another. In these environments, a great deal of information is exchanged through forums and email lists. It is difficult for participants in these collaborative efforts to determine the importance and accuracy of statements made by other participants, especially when there is contradictory information provided by different participants. For example, in on-line forums, there can be a large number of participants that each provide an opinion on a specific subject. It is difficult for the viewers of the forum to determine whether or not any given individual has expertise in the area of discussion. Similarly, it may useful to know whether a given participant providing information through such a forum has a good reputation with other participants or whether other participants have found the credibility of the specific participant providing the information to be lacking.

Some forums attempt to address this issue by tracking the number of posts that a particular participant has made. Also, similar statistics such as the date that the individual became part of a forum are tracked. Many forums provide a list of other posts made by a participant. Some users are designated as moderators or given similar titles and tasked to monitor the quality and appropriateness of discussions in the forum. Each of these tools or features is designed as a point of reference for participants in the forum to determine the credibility of a specific participant.

However, there are many ways that these tools fail to provide sufficient information for participants to make decisions about the credibility of any given participant. Many participants have insufficient time with a specific forum to build credibility. Although a specific participant may have other accounts in other forums or systems where the individual has built up credibility, that credibility is not transferable or knowable to the participants of other forums. For example, a participant in an open source debugging system may have one account for the debugging system, but have a separate account from other on-line forums. Thus, even if a participant utilizes a similar user name, avatar or personal identification in different accounts for forums or systems, it can be difficult to correlate the reputation or credibility of the participant across these systems. As a result, participants in each forum and project are ill-equipped to determine the credibility of any given contributor to a forum or project.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 2 is a diagram of one embodiment of a graphical user interface for displaying user credibility.

FIG. 6 is a diagram of one embodiment of a credibility rating system.

DETAILED DESCRIPTION

Described herein is a method and apparatus for providing a credibility rating and management system. The credibility rating and management system can be shared amongst any number of independent systems. The credibility rating and management system collects data points from each of the participant systems, tracks user profiles across each of the participant systems and generates a rating for each user profile. Associated systems can then query the credibility rating and management system to obtain the credibility rating for a user and incorporate the credibility ratings into their own systems.

Figure 1:
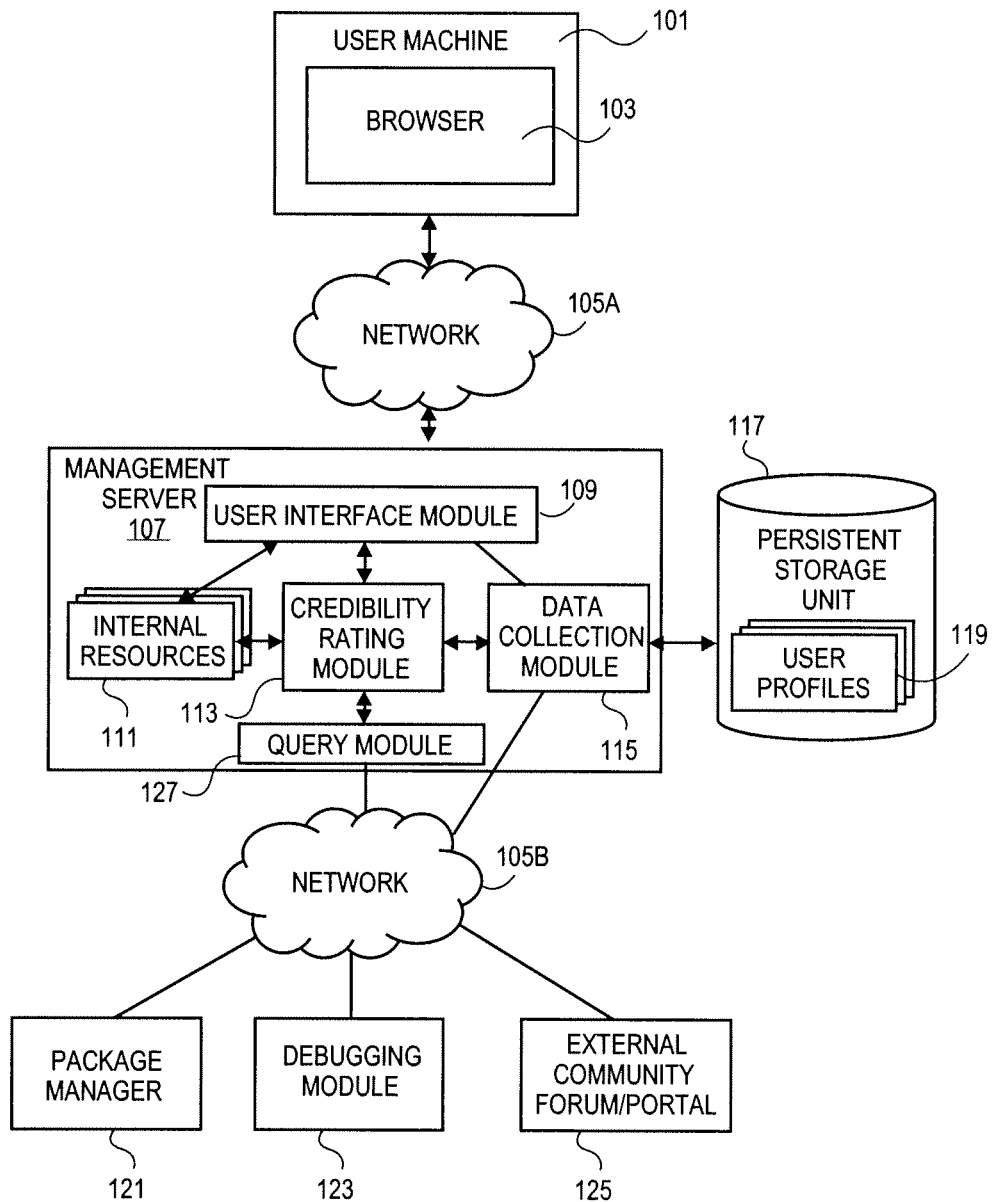
FIG. 1 is a diagram of one embodiment of a credibility management system.

FIG. 1 is a diagram of one embodiment of the credibility rating and management system. The credibility rating and management system may include a management server 107, a persistent storage unit 117, a set of user machines 101, a set of resources 121, 123 and 125 that rely on the credibility system and similar components. These components are in communication with each other through a set of networks 105A, 105B. A 'set,' as used herein, refers to any positive whole number of items including one item. A network 105A, 105B may be a local area network, a wide area network, such as the Internet, or similar network. A network 105A, 105B can be composed of any number of computing devices, network devices and similar communication devices. The network 105A, 105B can include any number of wired or wireless components.

A management server 107 includes a user interface module 109, a set of internal resources 111, a credibility rating module 113, a data collection module 115, a query module 127 and similar components. The management server 107 can be implemented on a set of desktop computers, laptop computers, dedicated servers, handheld devices, console devices or similar computing devices. The user interface module 109 provides a graphical user interface or command line interface to a set of remote machines 101 accessing the credibility rating and management system as provided by the management server 107. The user interface module 109 can be a web server that generates a web-based interface for the credibility rating and management system. The user interface module 109 can be utilized to review, update or manage a user profile 119. The user interface module 109 can also be utilize to configure the parameters of the credibility rating and management system including the credibility rating module, data collection module or query module.

The user interface module 109 can be accessed over a network 105A by any number of user machines 101. These user machines 101 can utilize a general purpose client such as a web browser 103 or specialized client application to interface with the user interface module 109, the internal resources 111, as well as, the credibility rating and management system generally.

In some embodiments, the management server 107 may also provide access to a set of internal resources 111. Internal resources 111 can be any set of tools, programs or applications. The internal resources 111 can utilize the credibility ratings provided by the credibility rating and management system and contribute feedback data to the system. For example, the management server 107 may host a set of forms, websites, mailing lists or similar resources. These resources query the credibility rating and management system to obtain a credibility rating for each of the users of these resources.

The credibility rating module 113 interacts with the internal resources 111, the user interface module 109, data collection module 115 and the current module 127. The credibility rating module 113 calculates the credibility rating for each tracked user profile 119. The credibility rating module 113 can service requests for credibility ratings, for a given user profile, directly or through a dedicated query module 127. The credibility rating module 113 also interacts with the data collection module 115, which obtains the data necessary for calculating the credibility rating that has been requested. The credibility rating module 113 can prompt the data collection module to obtain the necessary data or can rely on the independent operation of the data collection module to make the necessary information available in the relevant user profile 119.

The credibility rating module 113 can also manage the assignment of titles and privileges to a user based on the user credibility rating. A set of threshold values can be established by an administrator or similar entity that, if met, automatically cause the credibility rating module 113 to modify a title or set of privileges assigned to the user. Different titles can be tied to different threshold levels for the credibility rating, a sub-rating or similar feedback related criteria. Privileges can similarly be tied to threshold credibility ratings, sub-ratings or feedback related criteria. The privileges can be for access or control over internal resources 111 or resources provided by the associated systems 121, 123, 125.

The data collection module 115 manages the storage and retrieval of user profile 119 information that is utilized for the credibility rating and management system. Each data point received from internal resources 111, through the user interface 109, or from associated systems 121, 123, 125 is associated with a specific user profile 119 and stored in that user profile in the persistent storage 117. In other embodiments, the collected data points are stored in other intermediate data structures and subsequently associated with particular user profiles 119.

The query module 127 interfaces with associated systems 121, 123, 125 that provide data points in the form of feedback and ratings information. The query module 127 services requests for credibility ratings for the users of these systems. The query module 127 receives these requests and calls the credibility ratings module 113 to obtain the requested data and then manages the return of that data to the requesting entity. The query module 127 can communicate with these external services over a network 105B.

A persistent storage unit 117 can be a local storage device, a remote storage device, a distributed or array of storage devices or similar set of persistent storage devices. Persistent storage unit 117 can include optical storage devices, solid state storage devices, magnetic storage devices and similar storage devices. Persistent storage unit 117 can also store any of the internal resources 111, credibility rating module 113, data collection module 115, and user interface module 109 in addition to a set of user profiles 119 or similar collected data for the credibility rating and management system. The user profiles 119 can be stored in a database, file system or similar storage structure.

The associated systems 121, 123, 125 can include services such as a package manager 121, a debugging module 123, an external community forum or portal 125 or similar resources. Each of these systems is autonomous and can operate independent of the credibility rating and management system. These systems 121, 123, 125 can be provided by any type of computing device including desktop computers, laptop computers, dedicated server devices, network devices, handheld devices or similar computing devices.

The package manager 121, for example, can be a system for facilitating the development of software through the submission, review and storage of software packages for a community of software developers. A debugging module 123 can be a centralized resource for collaborating on the error checking for a software application or set of software applications as part of a software development or maintenance process. A community forum or portal 125 can be a set of web pages or bulletin boards, mailing lists or similar tools that enable a community to share and interact with one another. These external services are provided by way of example and one of ordinary skill in the art would understand that any other type of external service where user credibility is relevant could be utilized in connection with the credibility rating and management system.

Each of these external services collects its own data on user contributions, activity and feedback and provides these data points to the data collection module 115 on the management server 107. The data collection module 115 then associates the received data points with a user profile 119 that can span each of the associated systems. This user profile 119 data can then be used by the credibility rating module 113 to generate a rating for a specific user that encompasses the data from all the available associated systems and services where the user is a participant. The feedback data collected from the systems by the data collection module 115 can include project completion data, project acceptance rate data, team leadership data, discussion participation data, peer review data, mentorship participation data, project involvement length data, project success rate data, deadline fulfillment data or code review data.

The compilation of this data and generation of a universal credibility rating enables each of the associated systems and services to in turn make use of the credibility ratings by querying the credibility rating module 113, which incorporates this data stored in the user profiles 119. The credibility rating that is obtained can then be used as a part or a whole of a rating system for each associated system or service so that the users of these systems and services can have a great deal of confidence or ability to discern the utility of information provided by their community of users by associating with each of the users with a credibility rating that is more robust than that which they can generate based on their own local information.

Figure 2:
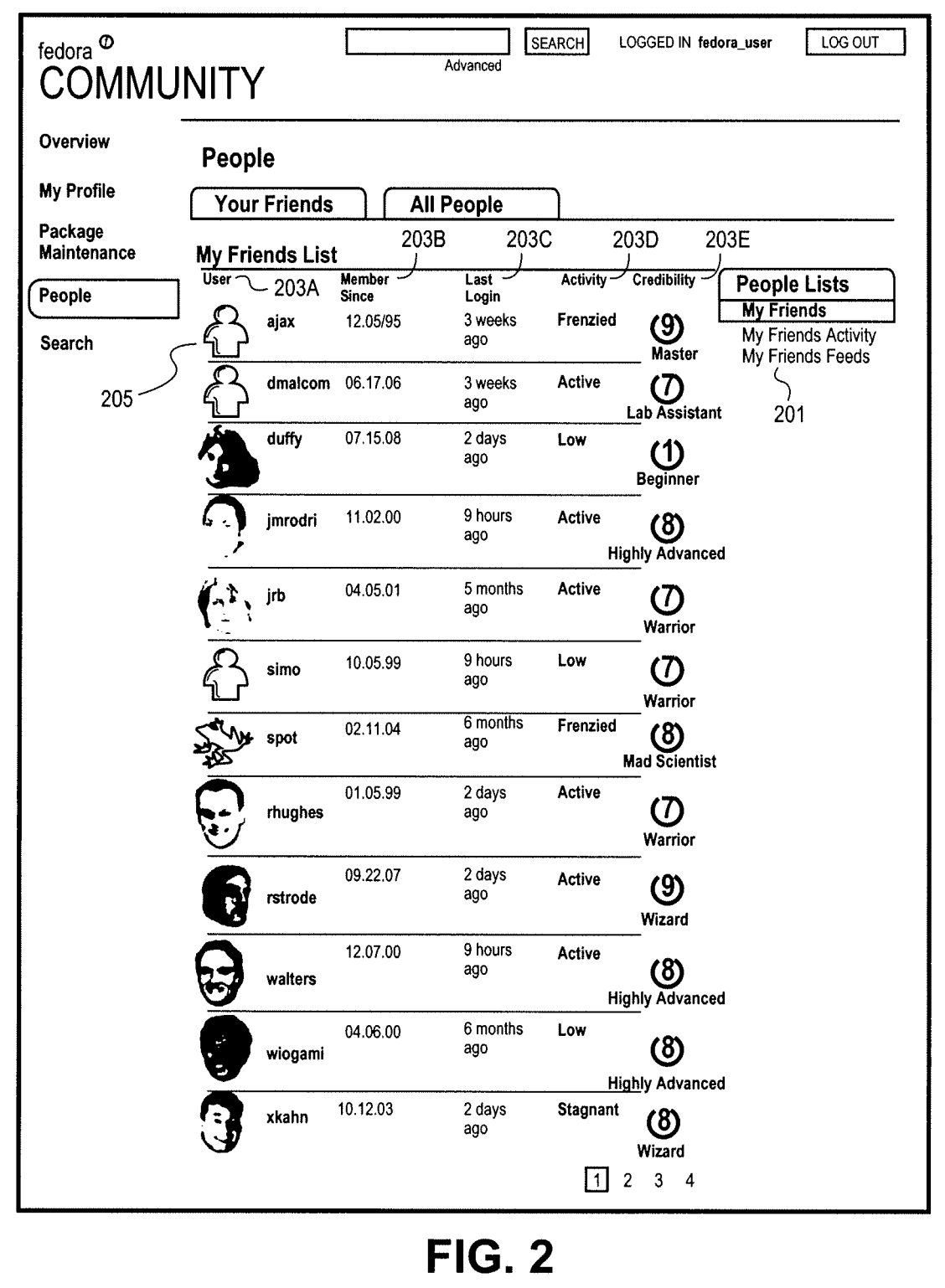

FIG. 2 is a diagram of one embodiment of a graphical user interface that displays credibility ratings for a set of users. In the example interface, a set of friends, co-workers, forum participants or similar list of community members that a particular user has interacted with, searched for or otherwise encountered or requested is presented. In the illustrated example, a list of friends for a particular user is presented.

Each friend is a member of the FEDORA development community. Any type of user interface can incorporate credibility data including, business applications, forums, chat interfaces, messaging interfaces, feedback interfaces and similar interface. Credibility ratings can be incorporated into the primary interface for a program or any secondary or ancillary interface. The friends list is provided by way of example. However, one skilled in the art would understand that credibility ratings can be incorporated into similar interfaces such as forums, mailing lists, Internet relay chat (IRCs), instant messaging (IM) and similar user interfaces.

The credibility ratings can be inserted into any aspect of a user interface. In many cases the credibility ratings are inserted near or as part of username information, avatar information or similar information that is presented to identify a participant. The credibility data can also be used to sort or organize the data in any graphical user interface. Subsets of feedback data including the credibility ratings can be filtered based on a filter menu 201. The filter menu 201 allows the user to select a set of designated friends to be displayed, a set of recent activities by friends to be displayed, a set of feeds by friends to be displayed or similar combinations of criteria that enable a user to sort the available information presented by the user interface. Other options might include a list of recently viewed users, recent contributions by users, recently viewed or accessed projects or similar filter tools that allow the system to present information relevant to the credibility of a user.

In the example friend list, the listing of friends is made in a set of rows with a separate user accounts listed in each row. The columns of the listing include a username or handle 203A, membership activation data 203B, last log-in date 203C, general activity level 203D and credibility rating 203E. The type and quantity of data presented can vary dependent on the type of user interface in which the credibility rating is utilized. The username 203A is provided to identify a particular user, whereas the membership data 203B, log in data 203C, activity data 203D and similar data are presented to give the viewer a sense of the depth and level of the participation of the given user. This can be informative in determining how involved a user is with the specific community or set of related communities that contribute to the credibility rating and thus how credible the information provided by that user might be. User information such as user membership data, log-in data and other activity data can be entirely obtained from the credibility rating and management system where it is stored in a user profile or can be maintained by the associated system itself.

The credibility rating 203E is retrieved and queried for each user from the credibility rating and management system. The rating can be expressed as a numerical value and/or a title or label. In the example illustrated, the ratings are have a range from negative ten to positive ten where higher ratings indicating a higher level of credibility. In other embodiments, all users may be given only positive ratings or at worst zero ratings, even if their negative feedback outweighs positive feedback. Any rating scale or numerical range can be utilized. Similarly, the titles can utilize and naming scheme and provide any level of descriptive value. The title may simply correspond to the credibility rating value or can provide additional information about the user or the user credibility. The title might indicate the correlation between the credibility rating and the primary source of the positive credibility. For example, if a user credibility is generally based on a single resource input than a title that ties the user to that resource might be utilized.

Additional credibility rating information can be accessed by selecting the display of the credibility rating in the user interface. In one embodiment, the aggregated user feedback data might be provided in whole or part to allow the viewer to discern how the credibility rating was generated. Links to other posts, work, threads or similar contributions of the user upon which the credibility is based can also be provided. In a further embodiment, specific peer feedback information can also be provided by selecting the credibility rating displayed in the user interface.

Figure 3:
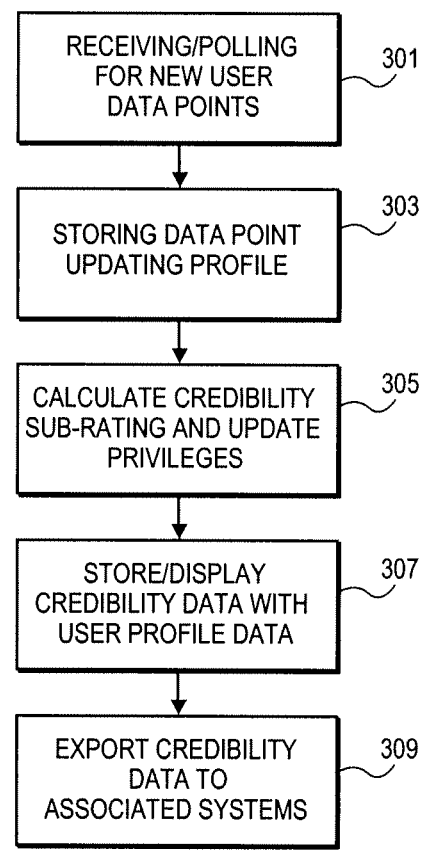
FIG. 3 is a flowchart of one embodiment of a process for updating credibility ratings.

FIG. 3 is a flowchart of one embodiment of a process for providing a credibility rating to associated servers. The process may be initiated by the credibility rating and management server receiving a data point from an associated system (block 301). A determination is made whether the data point is related to a new user or an existing user so that the data can be associated with the existing user profile or new user profile can be created. In another embodiment, the data point is obtained by polling the associated server. In some embodiments, received data points are reviewed or analyzed to determine their source. Feedback data received from a specific source or set of sources, such as a specific user, for one particular user can be throttled to prevent a single user from submitting multiple feedback items that artificially inflate or deflate a credibility rating in a short time period. Thus, some feedback data may be time or source limited. For example, a specific user may be restricted from providing feedback for another user during a predefined period after each feedback submission. This feature can be implemented by the data collection module. Once the data point has been associated with a particular user profile, the user profile can be updated, modified or similarly stored to reflect the newly received data point (Block 303).

The credibility rating for the user can then be updated based on the new data point (Block 305). The credibility rating can be generated by an aggregation of individual ratings from each of the servers, a scoring for each of the possible points of data, a weighting and accumulation-based data point type and data point sources, or similar application of a mathematical formula. In one embodiment, averages across all user profiles are determined for each data point. The user credibility rating can then be generated based on a comparison between the averages for each data point type and the score or value associated with the user for the same data point. This comparison can be utilized to calculate a deviation of the user profile data from the corresponding average. These deviations can be used to weight or similarly adjust the values related to the corresponding data points to generate the credibility rating.

The credibility rating algorithm can be adjusted or tailored for particular types of data sets. An administrator can set or adjust a set of weights for different parameters utilized to generate the credibility rating algorithm. The weighting can be specific to data point sources or data point types. The adjustment or tailoring can be facilitated by a user interface that presents a set of menus and user interface mechanisms for specifying and setting weights. The credibility rating result scale can be linear, exponential, irregular or similarly defined. For example, a credibility rating can be in a range of 0-10, where the underlying score required to earn each higher rating can progress linearly or exponentially.

In addition to calculation of credibility ratings, the credibility rating module can also update the privileges and titles assigned to the user based on the updated credibility rating. The privileges and titles can be tied to any number of tiers, thresholds or similar delineating criteria. The credibility rating module compares the updated credibility rating of a user against these values for each tracked or automated title or privilege. If a change in title or privileges is determined, then these changes are recorded in the user profile and associated system may be notified.

The newly-calculated credibility rating data can then be stored with the user profile data (Block 307). In another embodiment, the credibility rating is not explicitly stored in the user profile. Instead, the credibility rating is partially or wholly derived from the stored user feedback data in the profiles. The credibility rating can then be exported or sent to any of the associated systems (Block 309). The user profile data or credibility rating can be updated each time new data points are received or may only be updated in response to a query that is received from an internal resource or associated system.

Figure 4:
FIG. 4 is a diagram of one embodiment of a feedback display interface for feedback input and credibility rating information.

FIG. 4 is a diagram of a feedback display interface. This feedback display interface can be provided by any of the associated systems or provided by the credibility rating and management server through the user interface module. In one example embodiment, the feedback display interface includes a recent user interaction menu 401, a recent project menu 403 and a my rating statistic menu 405. This set of menus and interactive features is provided by way of example. One of ordinary skill in the art would understand that other similar interface menus can be utilized to provide analogous information relating to user activity across each of the systems that participate in the credibility rating and management system.

The recent user interaction menu 401 provides the viewer with the opportunity to provide feedback for each of the users that the viewer has recently encountered in any of the given associated systems for sake of convenience so that the user can have a centralized location to enter this data. Having a centralized location for feedback data entry avoids replication of effort. However, in other embodiments, each associated system can provide a separate feedback data entry system through any resource location or web page interface. The feedback information can be directly entered into the menu 401 or similar user interface element and then stored by the data collection module in the associated user profile.

The recent project menu 403 lists a set of projects that the user has recently worked on or reviewed. This menu 403 gives the user a convenient and centralized option for rating those systems. Ratings for projects or similar resources can be utilized in the generation of credibility ratings for the projects, as well as the users that are associated with the project. For example, if the project receives a high rating then those users associated with that project may also benefit from that rating. Conversely, if the project receives a low rating, then the credibility ratings of the users that participated in the project are lowered.

The 'My Rating Statistics' menu 405 lists the current credibility rating of the viewer, as well as, the title and any number of statistics that played a role in generating that credibility rating. Any data points maintained by an associated system or the credibility ratings and management system through the user profile can be made available to be viewed. A subset of the data points might be provided or only those that play the largest role in generating the rating. In one embodiment, the aspects of the credibility rating algorithm that were applied to the data points can also be presented or explained.

Figure 5:
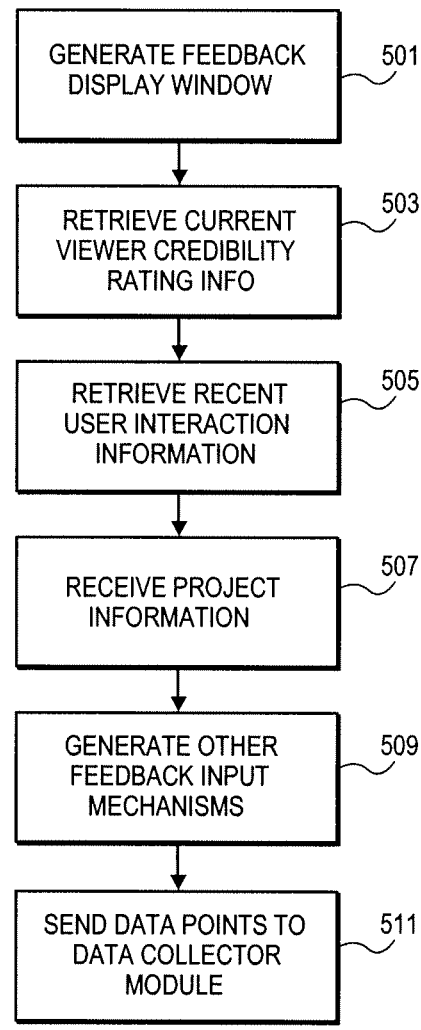
FIG. 5 is a flowchart of one embodiment of a process for generating the feedback display interface.

FIG. 5 is a flowchart of one embodiment of the process for generating the feedback display interface. In one embodiment, the feedback display interface is generated in response to a user request for the interface (Block 501). In other embodiments, the feedback display interface or aspects of the feedback display interface are automatically generated and presented after the viewer completes some aspect of a project or an interaction with other users so that the viewer can conveniently input relevant feedback information thereby creating data points to be utilized by the credibility rating and management system.

The current credibility information of the viewer can be retrieved and displayed in the 'My Rating Statistics' window (Block 503). This data can be retrieved by interaction with the query module or similar component to obtain the data from the corresponding user profile. The data can also be partially or wholly retrieved from locally-maintained feedback data (i.e., data tracked by the associated server).

The recent user activity data is retrieved (Block 505). This information may be utilized to generate the recent user interaction menu. This menu may then be utilized for the submission of feedback data for each of the users whom the viewer has recently interacted with in any community space such as a forum email list, project space or similar space. This recent interaction data can be reported to the credibility ratings and management system and tracked in the user profile. This data can also be tracked at the associated servers.

Similarly, recent project information may be retrieved to generate the project menu (Block 507). Information regarding any number of projects that a user has participated in can be retrieved. In one embodiment, the number or projects listed can be limited to the last five or similar number of projects. Any number of other feedback input mechanisms may be provided to allow the user to comment or provide credibility information for any of the associated systems, internal services, users, projects or similar entities, which the viewer has interacted with or participated in (Block 511). The data retrieval steps can have any relative order or can be executed in parallel. The feedback display interface then sends any collected data submitted by the user to the data collection module (Block 511).

FIG. 6 is a diagram of one embodiment of a computer system for providing a credibility rating and management system. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the browser and the server computer executing the user interface module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processing device implementing other instruction sets, or processing devices implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the credibility rating and management system 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the credibility rating and management system 626) embodying any one or more of the methodologies or functions described herein. The credibility rating and management system 626 may also reside, completely or at least partially, within the main memory 604 and/or within the processing device 602 during execution thereof by the computer system 600, the main memory 604 and the processing device 602 also constituting machine-readable storage media. The credibility rating and management system 626 may further be transmitted or received over a network 618 via the network interface device 622.

The computer-readable storage medium 624 may also be used to store the credibility rating and management system 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 628, components and other features described herein (for example in relation to FIG. 1) can be implemented as discrete hardware components or integrated in the functionality of hardware components such as ASICS, FPGAs, DSPs or similar devices. In addition, the modules 628 can be implemented as firmware or functional circuitry within hardware devices. Further, the modules 628 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "assigning," "calculating," "displaying," "storing," "servicing," "weighting," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for credibility rating and management system has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
    receiving, by a management server coupled to a plurality of computing devices via a set of one or more networks, feedback data from a plurality of independent systems executed by the plurality of computing device, each independent system providing a different service for a first user of a user computing device, the feedback data comprising a first feedback value corresponding to the first user for a first system of the plurality of independent systems and provided by a second user of the first system, wherein the second user provides the first feedback value via a feedback interface and in response to an indication, presented in the feedback interface, of a recent interaction between the second user and the first user with respect to the first system, wherein the first system is executed by a first computing device of the plurality of computing devices;
    identifying a user profile associated with the first user, the user profile maintained at a persistent storage unit coupled to the management server and storing a credibility rating for the first user;
    modifying the user profile to reflect the first feedback value received from the first system;
    determining an average feedback value for the first system from feedback data corresponding to a plurality of users of the first system, wherein the feedback data includes at least one of project completion data, project acceptance rate data, team leadership data, discussion participation data, peer review data, mentorship participation data, project involvement length data, project success rate data, deadline fulfillment data or code review data;
    determining a deviation between the first feedback value corresponding to the first user for the first system and the average feedback value for the first system;
    updating, by a processing device, the credibility rating for the first user in the user profile associated with the first user in view of the deviation between the first feedback value and the average feedback value;
    transmitting, over a wireless communication network, an indication of the updated credibility rating to at least one of the plurality of independent systems;
    comparing the updated credibility rating against one or more threshold values corresponding to a first privilege tier;
    assigning a set of privileges for the first system to the first user, the set of privileges corresponding to the first privilege tier; and
    controlling, by the management server, access of the first user to one or more resources provided by the first system executed by the first computing device of the plurality of computing devices and to one or more internal resources provided by the management server in view of the set of privileges of the first user corresponding to the first privilege tier and identified using the updated credibility rating representing the deviation between the first feedback value corresponding to the first user for the first system and the average feedback value for the first system, wherein controlling the access to the one or more internal resources comprises restricting access to at least one of the one or more internal resources by the user computing device over the set of one or more networks.

2. The computer-implemented method of claim 1, further comprising:
    servicing a query for the updated credibility rating for the first user.

3. The computer-implemented method of claim 1, further comprising:
    assigning a title or level to the first user in view of the updated credibility rating.

4. The computer-implemented method of claim 1, further comprising:
    generating a sub-rating in view of a subset of the feedback data in the user profile associated with the first user.

5. A system comprising:
    a memory; and
    a processing device coupled to the memory, the processing device to:
        manage, by a management server coupled to a plurality of computing devices via a set of one or more networks, user specific feedback data obtained from a plurality of independent systems executed by the plurality of computing device, each independent system providing a different service for a first user of a user computing device, the user specific feedback data comprising a first feedback value corresponding to the first user for a first system of the plurality of independent systems and provided by a second user of the first system, wherein the second user provides the first feedback value via a feedback interface and in response to an indication, presented in the feedback interface, of a recent interaction between the second user and the first user with respect to the first system, wherein the first system is executed by a first computing device of the plurality of computing devices;
        identify a user profile associated with the first user, the user profile maintained at a persistent storage unit coupled to the management server and storing a user specific credibility rating for the first user;
        modify the user profile to reflect the first feedback value received from the first system;
        determine an average feedback value for the first system from feedback data corresponding to a plurality of users of the first system, and a deviation between the first feedback value corresponding to the first user for the first system and the average feedback value for the first system, wherein the feedback data includes at least one of project completion data, project acceptance rate data, team leadership data, discussion participation data, peer review data, mentorship participation data, project involvement length data, project success rate data, deadline fulfillment data or code review data;
        update the user specific credibility rating for the first user in the user profile associated with the first user in view of the deviation between the first feedback value and the average feedback value;

compare the updated user specific credibility rating against one or more threshold values corresponding to a first privilege tier;

assign a set of privileges for the first system to the first user, the set of privileges corresponding to the first privilege tier; and control, by the management server, access by of the first user to one or more resources provided by the first system executed by the first computing device of the plurality of computing devices and to one or more internal resources provided by the management server in view of the set of privileges of the first user corresponding to the first privilege tier and identified using the updated credibility rating representing the deviation between the first feedback value corresponding to the first user for the first system and the average feedback value for the first system, wherein to control the access to the one or more internal resources, the processing device to restrict access to at least one of the one or more internal resources by the user computing device over the set of one or more networks.

6. The system of claim 5, wherein the processing device further to:

display credibility rating data for the first user.

7. The system of claim 5, wherein the processing device to limit peer review input to a predefined number of positive and negative reviews per time period.

8. A non-transitory computer-readable storage medium including instructions that, when executed, cause a processing device to:

receive, by a management server coupled to a plurality of computing devices via a set of one or more networks, feedback data from a plurality of independent systems executed by the plurality of computing device, each independent system providing a different service for a first user of a user computing device by the processing device, the feedback data comprising a first feedback value corresponding to the first user for a first system of the plurality of independent systems and provided by a second user of the first system, wherein the second user provides the first feedback value via a feedback interface and in response to an indication, presented in the feedback interface, of a recent interaction between the second user and the first user with respect to the first system, wherein the first system is executed by a first computing device of the plurality of computing devices;

identify a user profile associated with the first user, the user profile maintained at a persistent storage unit coupled to the management server and storing a credibility rating for the first user;

modify the user profile to reflect the first feedback value received from the first system;

determine an average feedback value for the first system from feedback data corresponding to a plurality of users of the first system, wherein the feedback data includes at least one of project completion data, project acceptance rate data, team leadership data, discussion participation data, peer review data, mentorship participation data, project involvement length data, project success rate data, deadline fulfillment data or code review data;

determine a deviation between the first feedback value corresponding to the first user for the first system and the average feedback value for the first system;

update the credibility rating for the first user in the user profile associated with the first user in view of the deviation between the first feedback value and the average feedback value;

compare the updated credibility rating against one or more threshold values corresponding to a first privilege tier;

assign a set of privileges for the first system to the first user, the set of privileges corresponding to the first privilege tier; and control, by the management server, access of the first user to one or more resources provided by the first system executed by the first computing device of the plurality of computing devices and to one or more internal resources provided by the management server in view of the set of privileges of the first user corresponding to the first privilege tier and identified using the updated credibility rating representing the deviation between the first feedback value corresponding to the first user for the first system and the average feedback value for the first system, wherein to control the access to the one or more internal resources, the processing device to restrict access to at least one of the one or more internal resources by the user computing device over the set of one or more networks.

9. The non-transitory computer-readable storage medium of claim 8, having further instructions stored therein that cause the processing device to:

service a query for the updated credibility rating for the first user.

10. The non-transitory computer-readable storage medium of claim 8, having further instructions stored therein that cause the processing device to:

assign a title or level to the first user in view of the credibility rating.

11. The non-transitory computer-readable storage medium of claim 8, having further instructions stored therein that cause the processing device to:

generate a sub-rating in view of a subset of the feedback data in the user profile associated with the first user.

* * * * *